(12) United States Patent
Shin et al.

(10) Patent No.: US 10,428,940 B2
(45) Date of Patent: Oct. 1, 2019

(54) HYDRAULIC PRESSURE SUPPLY SYSTEM OF DUAL CLUTCH TRANSMISSION FOR VEHICLE

(71) Applicant: Hyundai Motor Company, Seoul (KR)

(72) Inventors: Yong Uk Shin, Suwon-si (KR); Hyun Chul Kim, Suwon-si (KR); Woochurl Son, Seongnam-si (KR); Chang Yeon Cho, Seoul (KR); Woo Jin Chang, Suwon-si (KR); Wonmin Cho, Hwaseong-si (KR); Hyu Tae Shim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 203 days.

(21) Appl. No.: 15/377,923

(22) Filed: Dec. 13, 2016

(65) Prior Publication Data

US 2018/0023701 A1 Jan. 25, 2018

(30) Foreign Application Priority Data

Jul. 20, 2016 (KR) .................. 10-2016-0091984

(51) Int. Cl.
| | |
|---|---|
| *F16H 61/68* | (2006.01) |
| *F16H 61/688* | (2006.01) |
| *F16D 48/02* | (2006.01) |
| *F16H 57/04* | (2010.01) |
| *F16H 61/00* | (2006.01) |

(Continued)

(52) U.S. Cl.
CPC ....... *F16H 61/688* (2013.01); *F16D 48/0206* (2013.01); *F16H 57/0435* (2013.01); *F16H 57/0446* (2013.01); *F16H 57/0473* (2013.01); *F16H 57/0494* (2013.01); *F16H 61/0025* (2013.01); *F16H 61/0206* (2013.01); *F16H 61/30* (2013.01); *F16D 2048/0203* (2013.01); *F16D 2048/0266* (2013.01); *F16D 2048/0293* (2013.01); *F16D 2300/0214* (2013.01); *F16D 2300/06* (2013.01); *F16H 57/0412* (2013.01);

(Continued)

(58) Field of Classification Search
CPC ......... F16H 61/0031; F16H 2061/0037; F16H 57/0446; F16H 61/0206; F16H 61/0025; F16H 61/688
See application file for complete search history.

(56) References Cited

U.S. PATENT DOCUMENTS

| | | | | |
|---|---|---|---|---|
| 8,578,800 | B2 * | 11/2013 | Brandenburg | ...... F16H 61/0031 74/330 |
| 8,622,861 | B2 * | 1/2014 | Nett | ........................ B60K 6/442 475/5 |

FOREIGN PATENT DOCUMENTS

| | | |
|---|---|---|
| JP | 05-027423 U | 4/1993 |
| JP | 4207376 B2 | 1/2009 |

(Continued)

*Primary Examiner* — Abiy Teka
(74) *Attorney, Agent, or Firm* — Morgan, Lewis & Bockius LLP (57) ABSTRACT

Disclosed is a hydraulic pressure supply system of a dual clutch transmission for a vehicle in which by independently configuring a low pressure supply route and a high pressure supply route, the hydraulic pressure supply system can enable a low hydraulic pressure that is generated in a hydraulic pump for a low pressure to be supplied to a gear lubrication device and a clutch cooling/lubrication device and enable a low hydraulic pressure that is generated in a hydraulic pump for a high pressure to be supplied to a gear control device and a clutch control device.

11 Claims, 5 Drawing Sheets

(51) Int. Cl.
*F16H 61/30* (2006.01)
*F16H 61/02* (2006.01)

(52) U.S. Cl.
CPC .. *F16H 61/0031* (2013.01); *F16H 2061/0034* (2013.01); *F16H 2061/305* (2013.01)

(56) References Cited

FOREIGN PATENT DOCUMENTS

| | | |
|---|---|---|
| JP | 4704062 B2 | 6/2011 |
| JP | 2011-247147 A | 12/2011 |
| JP | 2015-086771 A | 5/2015 |
| KR | 10-2014-0075127 A | 6/2014 |
| KR | 10-1461922 B1 | 11/2014 |

* cited by examiner

HYDRAULIC PRESSURE SUPPLY SYSTEM OF DUAL CLUTCH TRANSMISSION FOR VEHICLE

CROSS-REFERENCE TO RELATED APPLICATION

The present application claims priority to Korean Patent Application No. 10-2016-0091984 filed on Jul. 20, 2016, the entire contents of which is incorporated herein for all purposes by this reference.

BACKGROUND OF THE INVENTION

Field of the Invention

The present invention relates to a hydraulic pressure supply system of a dual clutch transmission for a vehicle. More particularly, the present invention relates to a hydraulic pressure supply system of a dual clutch transmission for a vehicle that independently supplies each of hydraulic pressures that are supplied to a lubrication device of a gear and clutch requiring much flow rate and a control device of a gear and clutch requiring a hydraulic pressure of a high pressure.

Description of Related Art

Environmentally-friendly technology of a vehicle is core technology of a future vehicle industry, and vehicle makers devote their strength to development of an environmentally-friendly vehicle for satisfying environment and fuel consumption regulations.

The future vehicle technology exemplifies an Electric Vehicle (EV) and a Hybrid Electric Vehicle (HEV) using electrical energy and a Double Clutch Transmission (DCT) having improved efficiency and convenience.

The DCT has two clutch devices within an automatic transmission and a gear train of a manual transmission. The DCT selectively transmits a torque that is input from an engine to two input shafts using two clutches and shifts and outputs a torque that is selectively transmitted to the two input shafts using the gear train.

The DCT attempts to compactly implement a transmission that implements a high gear shift stage of a five-speed or more and controls two clutches and a synchronizing device by a controller, thereby being implemented into an Auto Manual Transmission (AMT) that makes a driver's manual shift unnecessarily.

Accordingly, compared with an automatic transmission using a planetary gear set, the DCT has excellent power delivery efficiency and easily performs a change and addition of a component for implementing a multistage and thus can cope with a fuel consumption regulation and improve multistage efficiency.

In the DCT, because a lubrication device and a control device require different hydraulic pressures and flow rates, it is necessary to independently supply a hydraulic pressure to the lubrication device and the control device.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic pressure supply system of a dual clutch transmission for a vehicle having advantages of being configured for independently supplying each of hydraulic pressures that are supplied to a lubrication device of a gear and clutch requiring much flow rate and a control device of a gear and clutch requiring a hydraulic pressure of a high pressure (i.e., a pressure higher than a predetermined pressure).

Various aspects of the present invention are directed to providing a hydraulic pressure supply system of a dual clutch transmission for a vehicle including: a low pressure supply route including a low pressure supply route comprising a low pressure hydraulic pump that generates a low hydraulic pressure using a fluid that is stored at a low pressure oil pan and that supplies the generated low hydraulic pressure directly to a gear lubrication device and a clutch cooling/lubrication device, and a cooler that cools a portion of a low hydraulic pressure that is supplied from the low pressure hydraulic pump and that supplies the portion of the low hydraulic pressure to the gear lubrication device or the clutch cooling/lubrication device; and a high pressure supply route including a high pressure hydraulic pump that generates a hydraulic pressure of a high pressure using a fluid that is stored at a high pressure oil pan and that supplies the generated high hydraulic pressure, a clutch control device including first and second clutch pressure control solenoid valves that supply a portion of the hydraulic pressure of a high pressure (i.e., a pressure higher than a predetermined pressure) to first and second clutches, and a gear control device including a gear actuator pressure control solenoid valve that is configured to control other portions of the hydraulic pressure of a high pressure and that supplies the controlled hydraulic pressure to a gear actuator, wherein the low pressure supply route and the high pressure supply route each are formed with an independent closed circuit.

The gear control device may further include a gear actuator flow rate control solenoid valve that is positioned between the gear actuator pressure control solenoid valve and the gear actuator and that regulates a flow rate of a hydraulic pressure that is supplied from the gear actuator pressure control solenoid valve to supply the flow rate to the gear actuator.

The low pressure supply route may further include a low pressure filter that is disposed between the low pressure oil pan and the low pressure hydraulic pump.

The low pressure supply route may further include a clutch protection relief valve and a first orifice that are disposed between upstream and downstream of the cooler.

The clutch protection relief valve may be formed with a one-way valve that supplies a hydraulic pressure only from the upstream side to the downstream side of the cooler.

The low pressure supply route may further include a switching valve regulating a flow rate supplied from the low pressure hydraulic pump and supplying the regulated flow rate selectively to the gear lubrication device and the clutch cooling/lubrication device.

The low pressure supply route may further include an ejection flow channel that is formed between the low pressure hydraulic pump and the switching valve, a first distribution flow channel that detours the switching valve and connects the low pressure hydraulic pump with the gear lubrication device, a second distribution flow channel that detours the switching valve and connects the low pressure hydraulic pump with the clutch cooling/lubrication device, a first bypass flow channel that is formed between the switching valve and the gear lubrication device, and a second bypass flow channel that is formed between the switching valve and the clutch cooling/lubrication device.

The low pressure supply route may further include a branch flow channel that connects the ejection flow channel and the first distribution flow channel, and the cooler may be disposed on the branch flow channel.

The low pressure supply route may further include a second orifice that is positioned on the first bypass flow channel between the cooler and the gear lubrication device and a third orifice that is positioned on the second distribution flow channel.

The high pressure supply route may further include a first high pressure filter that is positioned at the upstream side of the high pressure hydraulic pump, a second high pressure filter that is disposed at the downstream side of the high pressure hydraulic pump, and an one-way valve that is disposed in series to the second high pressure filter at the downstream side of the high pressure hydraulic pump.

The first high pressure filter may be formed with a mesh filter, and the second filter may be formed with a pressure filter.

The clutch control device may further include a fail-safe solenoid valve that is positioned at the upstream side of the first and second clutch pressure control solenoid valves.

The high pressure supply route may further include a supply flow channel that connects the high pressure hydraulic pump, the clutch control device, and the gear control device, and at the supply flow channel, an accumulator that temporarily stores hydraulic pressure supplied from the high pressure hydraulic pump and supplies the stored hydraulic pressure to the clutch control device, a line relief valve that maintains a hydraulic pressure on the supply flow channel to a predetermined pressure or less, and a pressure sensor that detects a hydraulic pressure on the supply flow channel are positioned.

According to an exemplary embodiment of the present invention, by independently configuring a low pressure supply route and a high pressure supply route, a low hydraulic pressure that is generated in a hydraulic pump for a low pressure can be supplied to a gear lubrication device and a clutch cooling/lubrication device, and a low hydraulic pressure that is generated in a hydraulic pump for a high pressure can be supplied to a gear control device and a clutch control device.

Accordingly, as the gear control device and the clutch control device are formed with an independent closed circuit, cleanliness of solenoid valves can be maintained. Further, by using a clutch lubricant, which is an exothermic element together with a gear lubricant, a churning loss can be minimized.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) may be intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive. Like reference numerals designate like elements throughout the specification.

In the following description, dividing names of components into first, second and the like is to divide the names because the names of the components are the same as each other and an order thereof is not particularly limited.

Figure 1:
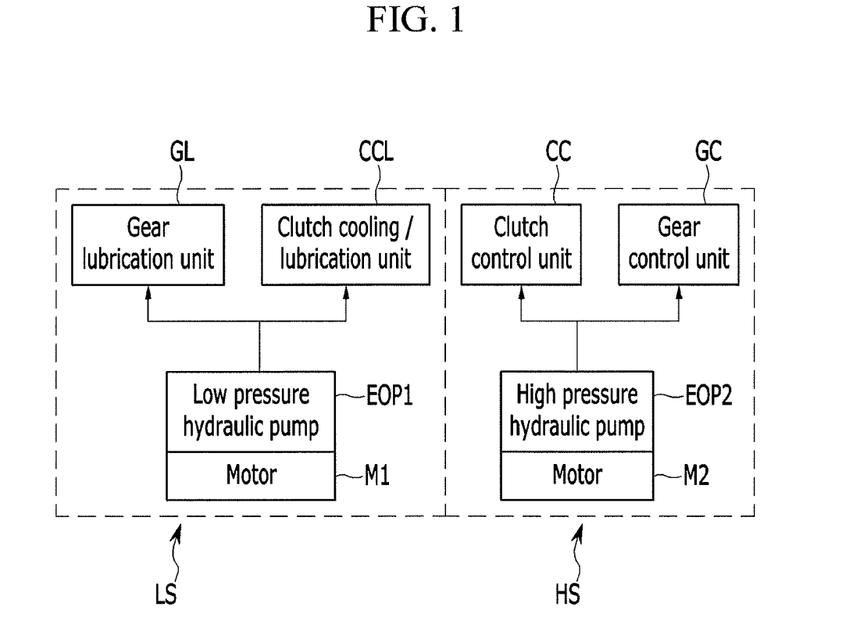
FIG. 1 is a schematic view of a hydraulic pressure supply system according to exemplary embodiments of the present invention.

FIG. 1 is a schematic view of a hydraulic pressure supply system according to exemplary embodiments of the present invention.

The hydraulic pressure supply system of FIG. 1 may be used for a Dual Clutch Transmission (DCT). In the DCT, a plurality of input gears are distributed and positioned at two input shafts, and a plurality of output gears that are gear engaged with the plurality of input gears are distributed and positioned at two output shafts. Further, the DCT includes a plurality of synchronizer mechanisms, and the plurality of synchronizer mechanisms selectively operate to connect one of the plurality of output gears and one of the two output shafts. Further, the DCT includes first and second clutches C1 and C2 (see FIG. 3), and the first and second clutches C1 and C2 each transfer power of a power source (e.g., engine or motor) to one of the two input shafts. The first and second clutches C1 and C2 alternately operate.

Referring to FIG. 1, in a hydraulic pressure supply system according to an exemplary embodiment of the present invention, a low pressure supply route LS and a high pressure supply route HS are independently configured.

The low pressure supply route LS is configured to supply a low hydraulic pressure that is generated in a low pressure hydraulic pump EOP1 to a gear lubrication device GL and a clutch cooling/lubrication device CCL, and a high pressure supply route HS is configured to supply a high hydraulic pressure that is generated in a high pressure hydraulic pump EOP2 to a gear control device GC and a clutch control device CC.

The low hydraulic pressure means a hydraulic pressure that is configured to be controlled and supplied with a lower pressure of a level that enables to smoothly perform cooling and lubrication of a shift gear that is related to a shift and a clutch that controls power of an engine, and a high hydraulic pressure means a hydraulic pressure that smoothly operates a clutch that is configured to control power of an engine and that is configured to be controlled and supplied with a high pressure (i.e., a pressure higher than a predetermined pressure) of a level that may operate a synchronizer mechanism for a shift. Further, a flow rate of a low hydraulic pressure is relatively larger than that of a high hydraulic pressure.

Figure 2:
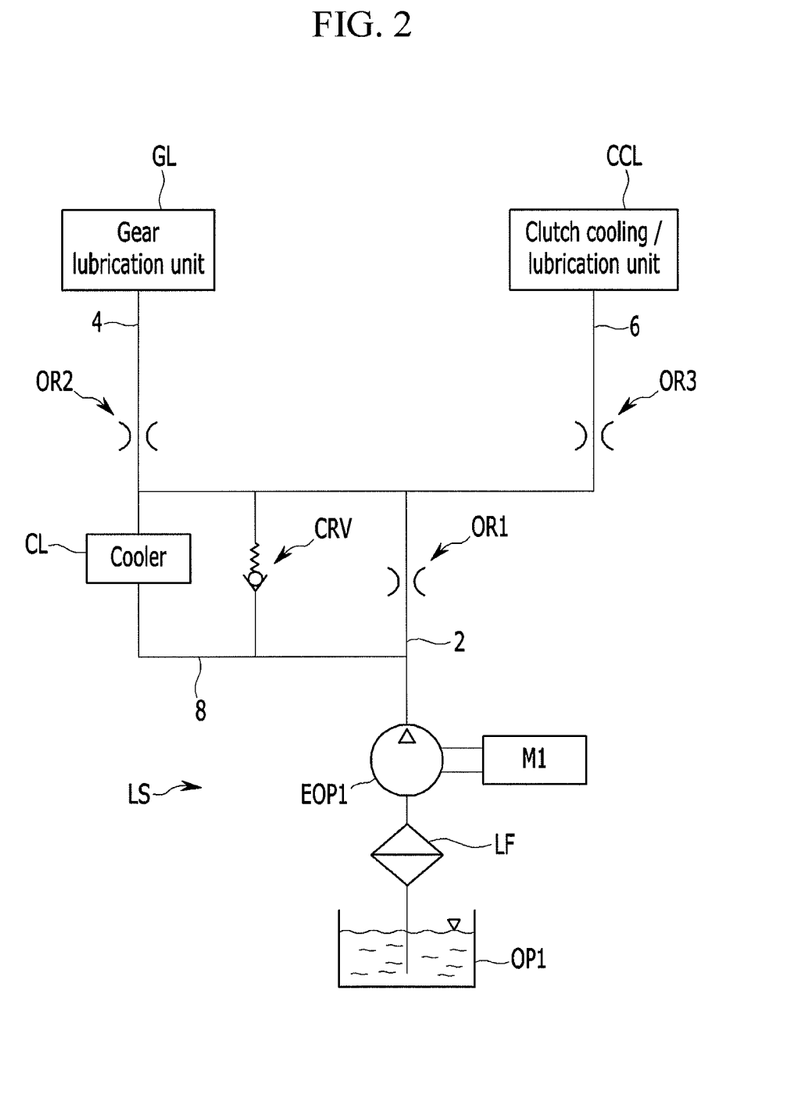
FIG. 2 is a hydraulic pressure system diagram of a low pressure supply route that is applied to a hydraulic pressure supply system according to the first exemplary embodiment of the present invention.

FIG. 2 is a hydraulic pressure system diagram of a low pressure supply route that is applied to a hydraulic pressure supply system according to the first exemplary embodiment of the present invention.

Referring to FIG. 2, a low pressure supply route LS includes a low pressure hydraulic pump EOP1. The low pressure hydraulic pump EOP1 generates a low pressure using oil that is input from a low pressure oil pan OP1 through a low pressure filter LF and supplies the generated low pressure to an ejection flow channel 2. The low pressure is supplied to a gear lubrication device GL and a clutch cooling/lubrication device CCL through first and second distribution flow channels 4 and 6 connected to the ejection flow channel 2.

Further, a cooler CL and a clutch protection relief valve CRV are positioned in parallel between a branch flow channel 8 that is branched at the upstream side of the ejection flow channel 2 and any one distribution flow channel 4 of the first and second distribution flow channels 4 and 6.

The clutch protection relief valve CRV is positioned to supply oil in one direction from the branch flow channel 8 to the first distribution flow channel 4.

Further, a first orifice OR1 is positioned on the ejection flow channel 2 between the first and second distribution flow channels 4 and 6 and the branch flow channel 8 to enable to always supply a portion of oil that is supplied from the low pressure hydraulic pump EOP1 to the branch flow channel 8. Therefore, the first orifice OR1 enables oil to always supply to the cooler CL.

Further, second and third orifices OR2 and OR3 are positioned on the first and second distribution flow channels 4 and 6. When a hydraulic pressure that is supplied from the low pressure hydraulic pump EOP1 is supplied to the gear lubrication device GL and the clutch cooling/lubrication device CCL through the first and second distribution flow channels 4 and 6, the second and third orifices OR2 and OR3 may enable the hydraulic pressure to be stably supplied.

Wet DCT exclusive oil may be used as oil using for a low pressure supply route LS, and it is preferable that a non-woven fabric type filter is used as a low pressure filter LF.

Figure 3:
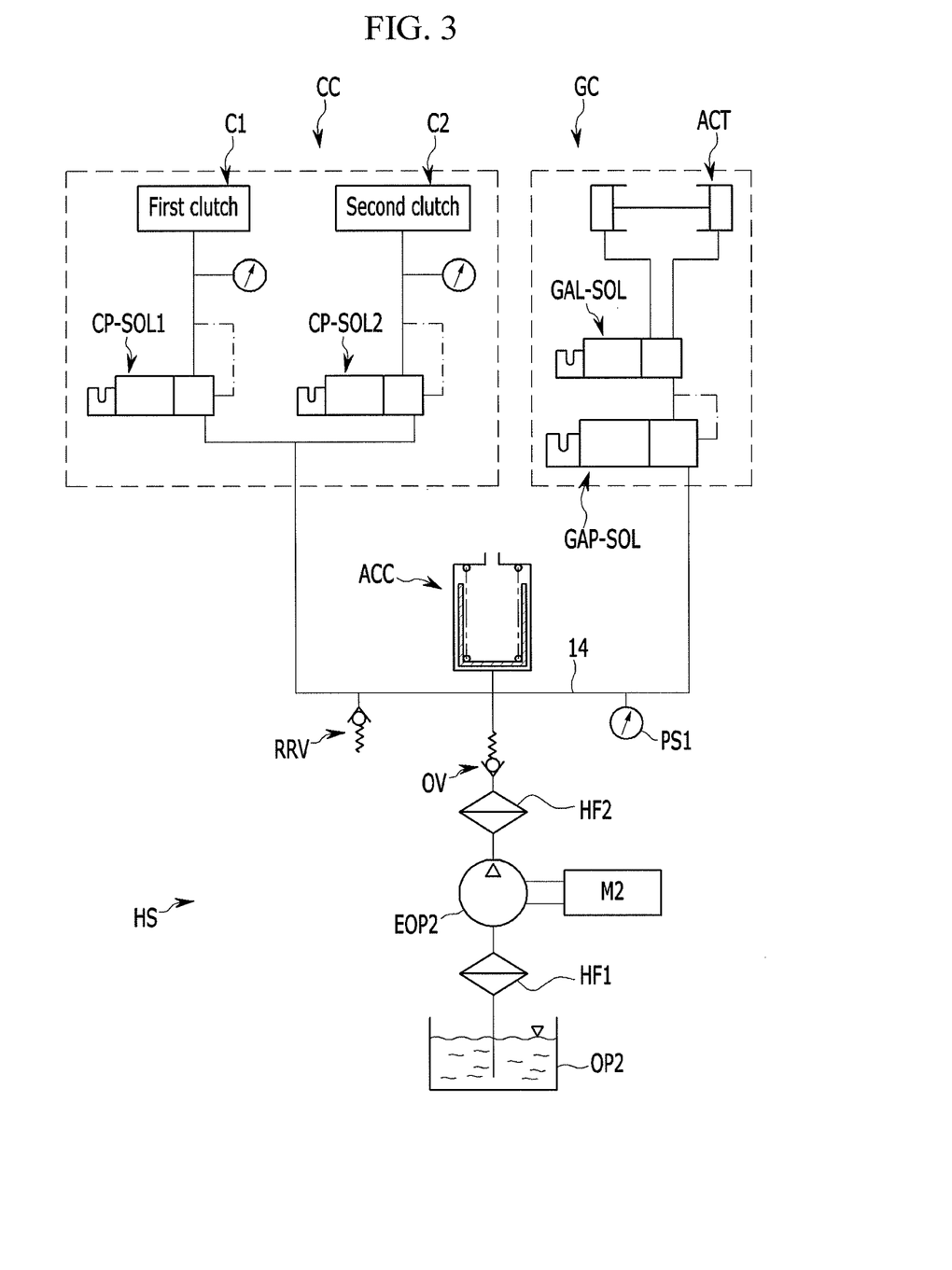
FIG. 3 is a hydraulic pressure system diagram of a high pressure supply route that is applied to a hydraulic pressure supply system according to the first exemplary embodiment of the present invention.

FIG. 3 is a hydraulic pressure system diagram of a high pressure supply route that is applied to a hydraulic pressure supply system according to the first exemplary embodiment of the present invention.

Referring to FIG. 3, a high pressure supply route HS includes a high pressure hydraulic pump EOP2. The high pressure hydraulic pump EOP2 generates a high pressure using oil that is injected from a high pressure oil pan OP2 through a first high pressure filter HF1. The generated high pressure passes through a second high pressure filter HF2 and a one-way valve OV and is supplied to the clutch control device CC and the gear control device GC through a supply flow channel 14.

Further, an accumulator ACC, a line relief valve RRV, and a first pressure sensor PS1 are positioned on the supply flow channel 14.

The accumulator ACC for a predetermined time stores a hydraulic pressure that is supplied from the high pressure hydraulic pump EOP2 and supplies the stored hydraulic pressure to the supply flow channel 14, as needed.

The line relief valve RRV maintains a hydraulic pressure on the supply flow channel 14 to a predetermined pressure or less, and the pressure sensor PS detects a pressure on the supply flow channel 14 and transfers a signal thereof to a transmission control device.

The clutch control device CC includes first and second clutch pressure control solenoid valves CP-SOL1 and CP-SOL2. A hydraulic pressure that is supplied from the supply flow channel 14 is supplied to the first and second clutch pressure control solenoid valves CP-SOL1 and CP-SOL2.

The first and second clutch pressure control solenoid valves CP-SOL1 and CP-SOL2 control the hydraulic pressure to selectively supply the hydraulic pressure to the first and second clutches C1 and C2. Accordingly, the first and second clutches C1 and C2 alternately operate.

It is exemplified but is not limited that the clutch control device CC controls two clutches C1 and C2. If the first exemplary embodiment is applied to a hybrid electric vehicle, one clutch serving as an engine clutch may be added and the one clutch may be disposed in parallel with the two clutches C1 and C2.

The gear control device GC includes a gear actuator pressure control solenoid valve GAP-SOL and a gear actuator flow rate control solenoid valve GAL-SOL. A hydraulic pressure that is supplied from the supply flow channel 14 is configured to be controlled in the gear actuator pressure control solenoid valve GAP-SOL and is supplied to the gear actuator flow rate control solenoid valve GAL-SOL.

Thereafter, the gear actuator flow rate control solenoid valve GAL-SOL regulates a flow rate of the hydraulic pressure to supply the flow rate to any one chamber of two chambers of a gear actuator ACT that manipulates a synchronizer mechanism and returns a hydraulic pressure within another chamber.

The number of the gear actuator flow rate control solenoid valve GAL-SOL and the gear actuator ACT is determined according to the number of a gear shift stage in which the DCT implements, and the gear actuator ACT and the gear actuator flow rate control solenoid valve GAL-SOL of one set may control two gear shift stages.

It is preferable that the first high pressure filter HF1 that is applied to the high pressure supply route HS is formed with a mesh filter and that the second high pressure filter HF2 is formed with a pressure filter, and it is preferable that oil is low viscosity exclusive oil for the control.

Further, by applying the high pressure hydraulic pump EOP2 and the accumulator ACC, when a hydraulic pressure is a predetermined pressure or less (approximately 40 bar), the high pressure hydraulic pump EOP2 operates to supply an operation pressure to the accumulator ACC and the solenoid valves, and when the hydraulic pressure is a predetermined pressure or more (approximately 60 bar), the high pressure supply route HS stops operation of the high pressure hydraulic pump EOP2 and supplies a hydraulic pressure that is stored at the accumulator ACC to solenoid valves.

The low pressure hydraulic pump EOP1 and the high pressure hydraulic pump EOP2 are configured with an electric motion type hydraulic pump that is independently driven by motors M1 and M2, respectively.

Figure 4:
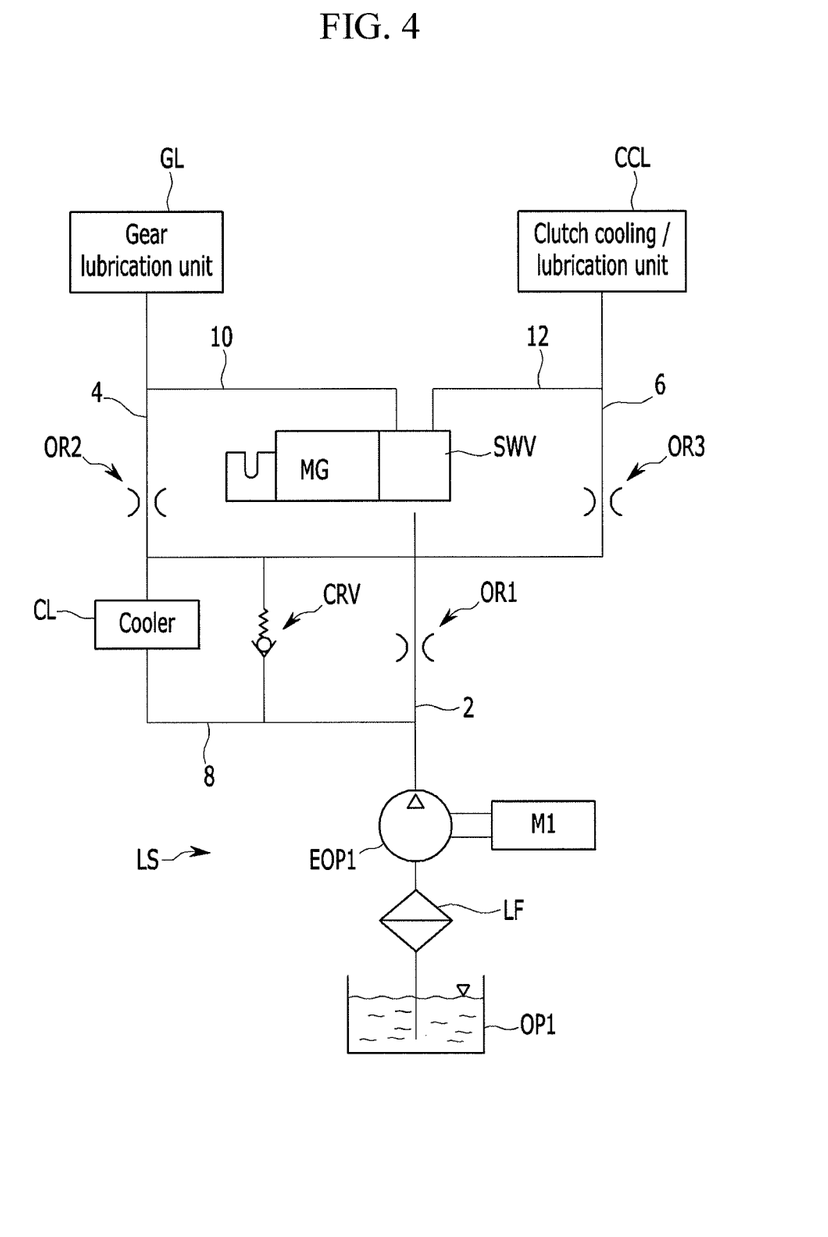
FIG. 4 is a hydraulic pressure system diagram of a low pressure supply route that is applied to a hydraulic pressure supply system according to the second exemplary embodiment of the present invention.

FIG. 4 is a hydraulic pressure system diagram of a low pressure supply route that is applied to a hydraulic pressure supply system according to the second exemplary embodiment of the present invention.

Referring to FIG. 4, the low pressure supply route LS according to the second exemplary embodiment of the present invention, compared with the first exemplary embodiment, further includes a switching valve SWV. The switching valve SWV regulates a flow rate by the control of a magnet MG and supplies the regulated flow rate to the gear lubrication device GL and the clutch cooling/lubrication device CCL through first and second bypass flow channels 10 and 12.

Downstream portions of the first and second bypass flow channels 10 and 12 are connected to downstream portions of the first and second distribution flow channels 4 and 6, especially to downstream portions of the second and third orifices OR2 and OR3.

Therefore, the low pressure supply route LS according to the second exemplary embodiment of the present invention can stably supply the hydraulic pressure supplied from the low pressure hydraulic pump EOP1 to the gear lubrication device GL and the clutch cooling/lubrication device CCL through the second and third orifice OR2 and OR3 positioned on the first and second distribution flow channels 4 and 6.

In addition, hydraulic pressure may be supplied selectively any one of the gear lubrication device GL and the clutch cooling/lubrication device CCL by the switching valve SWV controlled by the magnet MG.

Figure 5:
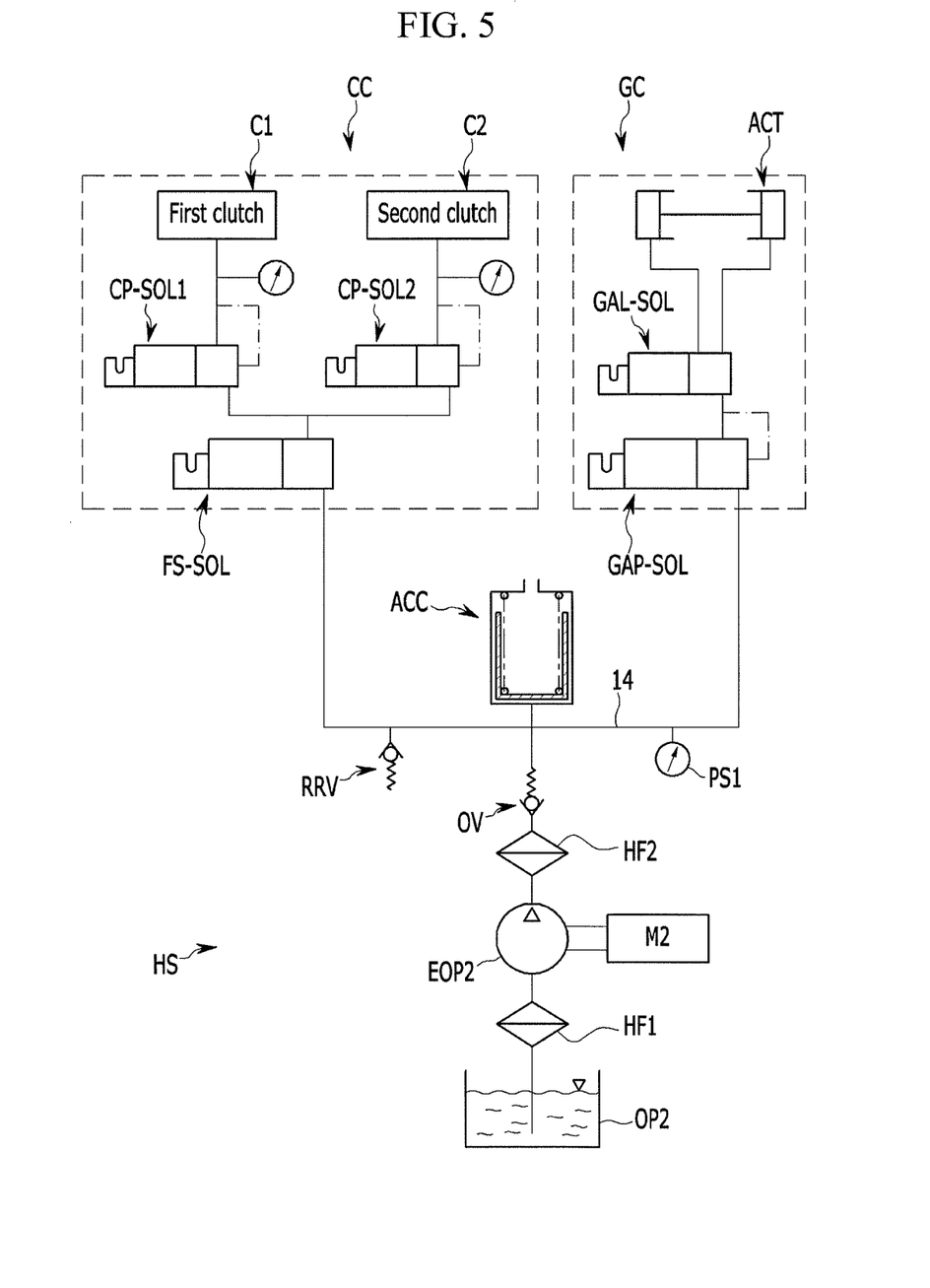
FIG. 5 is a hydraulic pressure system diagram of a high pressure supply route that is applied to a hydraulic pressure supply system according to the second exemplary embodiment of the present invention.

FIG. 5 is a hydraulic pressure system diagram of a high pressure supply route that is applied to a hydraulic pressure supply system according to the second exemplary embodiment of the present invention.

Referring to FIG. 5, the high pressure supply route HS according to the second exemplary embodiment of the present invention, compared to the first exemplary embodiment, further includes a fail-safe solenoid valve FS-SOL.

The fail-safe solenoid valve FS-SOL is positioned on the supply flow channel 14 upstream of the first and second clutch pressure control solenoid valves CP-SOL1 and CP-SOL2, and supplies hydraulic pressure to any one clutch of the first and second clutches C1 and C2 even when the hydraulic pressure supply system is out of order.

In a hydraulic pressure supply system for a DCT according to an exemplary embodiment of the present invention, a low pressure supply route LS and a high pressure supply route HS are independently configured, and the hydraulic pressure supply system enables a low hydraulic pressure that is generated in a low pressure hydraulic pump EOP1 to be supplied to a gear lubrication device GL and a clutch cooling/lubrication device CCL and enables a low hydraulic pressure that is generated in a high pressure hydraulic pump EOP2 to be supplied to a gear control device GC and a clutch control device CC.

Accordingly, as the gear control device and the clutch control device each are formed with an independent closed circuit, the gear control device and the clutch control device may maintain cleanliness of solenoid valves. Further, by using a clutch lubricant, which is an exothermic element together with a gear lubricant, a churning loss can be minimized.

For convenience in explanation and accurate definition in the appended claims, the terms "upper", "lower", "inner" and "outer", "up," "down," "upper", "lower," "upwards," "downwards", "front", "rear", "back", "inside", "outside", "inwardly," "outwardly," "interior", "exterior", "inner," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure supply system of a dual clutch transmission for a vehicle, the hydraulic pressure supply system comprising:

a low pressure supply route comprising a low pressure hydraulic pump that generates a low hydraulic pressure using a fluid that is stored at a low pressure oil pan and that supplies a generated low hydraulic pressure directly to a gear lubrication device and a clutch cooling/lubrication device, and a cooler that cools a portion of the low hydraulic pressure that is supplied from the low pressure hydraulic pump and that supplies the portion of the low hydraulic pressure to the gear lubrication device or the clutch cooling/lubrication device; and a high pressure supply route comprising a high pressure hydraulic pump that generates a high hydraulic pressure using a fluid that is stored at a high pressure oil pan and that supplies a generated high hydraulic pressure, a clutch control device including first and second clutch pressure control solenoid valves that supply a portion of the high hydraulic pressure to first and second clutches, and a gear control device including a gear actuator pressure control solenoid valve that is configured to control other portion of the high hydraulic pressure and that supplies a controlled hydraulic pressure to a gear actuator, wherein the low pressure supply route and the high pressure supply route each are formed with an independent closed circuit, wherein the low hydraulic pressure is a hydraulic pressure lower than a predetermined hydraulic pressure and the high hydraulic pressure is a hydraulic pressure equal to or higher than the predetermined hydraulic pressure, wherein the low pressure supply route further comprises a switching valve regulating a flow rate supplied from the low pressure hydraulic pump and supplying a regulated flow rate selectively to the gear lubrication device and the clutch cooling/lubrication device, and wherein the low pressure supply route further comprises an ejection flow channel that is formed between the low pressure hydraulic pump and the switching valve, a first distribution flow channel that detours the switching valve and connects the low pressure hydraulic pump with the gear lubrication device a second distribution flow channel that detours the switching valve and connects the low pressure hydraulic pump with the clutch cooling/lubrication device, a first bypass flow channel that is formed between the switching valve and the gear lubrication device, and a second bypass flow channel that is formed between the switching valve and the clutch cooling/lubrication device.

2. The hydraulic pressure supply system of claim 1, wherein the gear control device further includes a gear actuator flow rate control solenoid valve that is positioned between the gear actuator pressure control solenoid valve and the gear actuator and that regulates a flow rate of a hydraulic pressure that is supplied from the gear actuator pressure control solenoid valve to supply the flow rate to the gear actuator.

3. The hydraulic pressure supply system of claim 1, wherein the low pressure supply route further comprises a low pressure filter that is disposed between the low pressure oil pan and the low pressure hydraulic pump.

4. The hydraulic pressure supply system of claim 1, wherein the low pressure supply route further comprises a clutch protection relief valve and a first orifice that are disposed between upstream and downstream of the cooler.

5. The hydraulic pressure supply system of claim 4, wherein the clutch protection relief valve is formed with a one-way valve that supplies a hydraulic pressure only from the upstream to the downstream of the cooler.

6. The hydraulic pressure supply system of claim 1, wherein the low pressure supply route further comprises a branch flow channel that connects the ejection flow channel and the first distribution flow channel, and the cooler is positioned on the branch flow channel.

7. The hydraulic pressure supply system of claim 1, wherein the low pressure supply route further includes a second orifice that is positioned on the first distribution flow channel between the cooler and the gear lubrication device and a third orifice that is positioned on the second distribution flow channel.

8. The hydraulic pressure supply system of claim 1, wherein the clutch control device further includes a fail-safe solenoid valve that is positioned at an upstream side of the first and second clutch pressure control solenoid valves.

9. A hydraulic pressure supply system of a dual clutch transmission for a vehicle, the hydraulic pressure supply system comprising:
a low pressure supply route comprising a low pressure hydraulic pump that generates a low hydraulic pressure using a fluid that is stored at a low pressure oil pan and that supplies a generated low hydraulic pressure directly to a gear lubrication device and a clutch cooling/lubrication device, and a cooler that cools a portion of the low hydraulic pressure that is supplied from the low pressure hydraulic pump and that supplies the portion of the low hydraulic pressure to the near lubrication device or the clutch cooling/lubrication device; and
a high pressure supply route comprising a high pressure hydraulic pump that generates a high hydraulic pressure using a fluid that is stored at a high pressure oil pan and that supplies a generated high hydraulic pressure, a clutch control device including first and second clutch pressure control solenoid valves that supply a portion of the high hydraulic pressure to first and second clutches, and a gear control device including a gear actuator pressure control solenoid valve that is configured to control other portion of the high hydraulic pressure and that supplies a controlled hydraulic pressure to a gear actuator,
wherein the low pressure supply route and the high pressure supply route each are formed with an independent closed circuit,
wherein the low hydraulic pressure is a hydraulic pressure lower than a predetermined hydraulic pressure and the high hydraulic pressure is a hydraulic pressure equal to or higher than the predetermined hydraulic pressure, and
wherein the high pressure supply route further comprises a first high pressure filter that is positioned at an upstream side of the high pressure hydraulic pump, a second high pressure filter that is disposed at a downstream side of the high pressure hydraulic pump, and an one-way valve that is disposed in series to the second high pressure filter at the downstream side of the high pressure hydraulic pump.

10. The hydraulic pressure supply system of claim 9, wherein the first high pressure filter is formed with a mesh filter, and the second high pressure filter is formed with a pressure filter.

11. A hydraulic pressure supply system of a dual clutch transmission for a vehicle, the hydraulic pressure supply system comprising:
a low pressure supply route comprising a low pressure hydraulic pump that generates a low hydraulic pressure using a fluid that is stored at a low pressure oil pan and that supplies a generated low hydraulic pressure directly to a gear lubrication device and a clutch cooling/lubrication device, and a cooler that cools a portion of the low hydraulic pressure that is supplied from the low pressure hydraulic pump and that supplies the portion of the low hydraulic pressure to the gear lubrication device or the clutch cooling/lubrication device; and
a high pressure supply route comprising a high pressure hydraulic pump that generates a high hydraulic pressure using a fluid that is stored at a high pressure oil pan and that supplies a generated high hydraulic pressure, a clutch control device including first and second clutch pressure control solenoid valves that supply a portion of the high hydraulic pressure to first and second clutches, and a gear control device including a gear actuator pressure control solenoid valve that is configured to control other portion of the high hydraulic pressure and that supplies a controlled hydraulic measure to a gear actuator,
wherein the low pressure supply route and the high pressure supply route each are formed with an independent closed circuit,
wherein the low hydraulic pressure is a hydraulic pressure lower than a predetermined hydraulic pressure and the high hydraulic Pressure is a hydraulic pressure equal to or higher than the redetermined hydraulic pressure, and
wherein the high pressure supply route further includes a supply flow channel that connects the high pressure hydraulic pump, the clutch control device, and the gear control device, and
at the supply flow channel, an accumulator that temporarily stores hydraulic pressure supplied from the high pressure hydraulic pump and supplies a stored hydraulic pressure to the clutch control device, a line relief valve that maintains a hydraulic pressure on the supply flow channel to a predetermined pressure or less, and a pressure sensor that detects a hydraulic pressure on the supply flow channel are positioned.

* * * * *